US009834053B2

(12) United States Patent
Frank et al.

(10) Patent No.: US 9,834,053 B2
(45) Date of Patent: Dec. 5, 2017

(54) VEHICLE AIR SUSPENSION INSTALLATION AND OPERATING METHOD (75) Inventors: Dieter Frank, Hannover (DE); Jorg Meier, Hessisch Oldendorf (DE); Frank Meissner, Hannover (DE)

(73) Assignee: WABCO GMBH, Hannover (DE)

( * ) Notice: Subject to any disclaimer, the term of this patent is extended or adjusted under 35 U.S.C. 154(b) by 744 days.

(21) Appl. No.: 13/991,788

(22) PCT Filed: Nov. 22, 2011

(86) PCT No.: PCT/EP2011/005861
§ 371 (c)(1),
(2), (4) Date: Jun. 5, 2013

(87) PCT Pub. No.: WO2012/079686
PCT Pub. Date: Jun. 21, 2012

(65) Prior Publication Data
US 2013/0247553 A1    Sep. 26, 2013

(30) Foreign Application Priority Data
Dec. 16, 2010    (DE) .......................... 10 2010 054 703

(51) Int. Cl.
*B60G 11/27*    (2006.01)
*B60G 17/015*    (2006.01)
(Continued)

(52) U.S. Cl.
CPC ............ *B60G 11/27* (2013.01); *B60G 17/018* (2013.01); *B60G 17/0155* (2013.01);
(Continued)

(58) Field of Classification Search
CPC ................ B60G 11/27; B60G 17/0528; B60G 17/0155; B60G 17/018; B60G 2500/204;
(Continued)

(56) References Cited

U.S. PATENT DOCUMENTS 3,937,521 A  *  2/1976  Reuter .................. B65G 53/66
                                                            34/221
4,655,255 A       4/1987  Rode
                        (Continued)

FOREIGN PATENT DOCUMENTS

DE           2 016 030          2/1972
DE           35 01 708 A1       7/1986
                        (Continued)

*Primary Examiner* — Paul N Dickson
*Assistant Examiner* — Timothy Wilhelm
(74) *Attorney, Agent, or Firm* — Leydig, Voit & Mayer, Ltd.

(57) ABSTRACT

A vehicle air suspension installation includes pneumatics configured for operation in conjunction with a compressed air supply installation, and comprises: a pneumatic line having a port connection to the air supply installation, air bellows, each serving as a pressure chamber for an air spring, one air bellows being connected to the pneumatic line via a directional solenoid valve, and the air bellows being fillable/bleedable depending on a switching state of the valve, and first and second directional valves forming a solenoid valve system, which has a pneumatic part that is actuatable by a magnetic part. The first directional valve forms a primary valve, and the second forms a secondary valve. First and second air bellows associated with the valve system are fillable/bleedable depending on the switching state of the primary and secondary valves. The primary and secondary valves are controllable by a controller of the magnetic part. The controller is common to and acts upon both valves.

22 Claims, 4 Drawing Sheets (51) Int. Cl.
  *B60G 17/018* (2006.01)
  *B60G 17/052* (2006.01)
(52) U.S. Cl.
  CPC ...... *B60G 17/0528* (2013.01); *B60G 2300/07* (2013.01); *B60G 2400/51222* (2013.01); *B60G 2500/02* (2013.01); *B60G 2500/203* (2013.01); *B60G 2500/204* (2013.01); *B60G 2500/302* (2013.01); *B60G 2600/26* (2013.01)
(58) Field of Classification Search
  CPC .......... B60G 2500/302; B60G 2500/02; B60G 2500/203; B60G 2600/26; B60G 2300/07; B60G 2400/51222
  See application file for complete search history.

(56) References Cited

U.S. PATENT DOCUMENTS

| | | | |
|---|---|---|---|
| 4,755,008 A * | 7/1988 | Imoto | B60T 8/341 180/197 |
| 5,467,595 A * | 11/1995 | Smith | B60G 17/052 280/124.16 |
| 5,896,076 A * | 4/1999 | van Namen | H01F 7/1615 335/222 |
| 6,026,860 A * | 2/2000 | Teichmann | F16K 31/06 137/870 |
| 6,354,617 B1 * | 3/2002 | Behmenburg | B60G 17/0523 137/100 |
| 6,726,189 B2 * | 4/2004 | Folchert | B60G 17/0523 267/64.16 |
| 6,726,224 B2 | 4/2004 | Jurr et al. | |
| 6,752,402 B2 * | 6/2004 | Grotendorst | B60G 11/27 280/5.507 |
| 6,817,600 B2 | 11/2004 | Ocker et al. | |
| 7,032,895 B2 * | 4/2006 | Folchert | B60G 17/0523 267/64.28 |
| 7,441,789 B2 * | 10/2008 | Geiger | B60G 17/0155 280/124.157 |
| 7,741,941 B2 * | 6/2010 | Buezis | F16K 31/0682 335/220 |
| 8,899,598 B2 * | 12/2014 | Frank | F16K 31/0651 137/565.18 |
| 9,205,719 B2 * | 12/2015 | Frank | B60G 17/0523 |
| 2007/0236084 A1 * | 10/2007 | Frank | B60T 8/327 303/119.2 |
| 2009/0309413 A1 | 12/2009 | Bensch et al. | |

FOREIGN PATENT DOCUMENTS

| | | |
|---|---|---|
| DE | 39 31 742 A1 | 4/1991 |
| DE | 43 27 763 A1 | 2/1995 |
| DE | 43 27 764 A1 | 2/1995 |
| DE | 102 23 405 A1 | 12/2003 |
| DE | 10 2006 041 010 A1 | 3/2008 |
| EP | 1 165 333 B2 | 1/2002 |
| EP | 1 216 860 A2 | 6/2002 |

* cited by examiner

VEHICLE AIR SUSPENSION INSTALLATION AND OPERATING METHOD

FIELD OF THE INVENTION

The invention generally relates to an air suspension installation for a vehicle.

BACKGROUND OF THE INVENTION

A pneumatic system of the general type under consideration, e.g., disclosed in EP 1 165 333 B2, is used in vehicles of all types. A pneumatic system of this type is used for the suspension and potentially also for level control in a vehicle, so that the distance between the axle of the vehicle and body of the vehicle can be adjusted. An air suspension installation of such type comprises a plurality of bellows, each acting as a pressure chamber for a pneumatic spring, which raises the body of the vehicle with increasing filling and can lower it with decreasing pressurization. With increasing distance between the axle of the vehicle and the body of the vehicle or ground clearance, the spring travels can be longer and more uneven surfaces can also be overcome without this leading to contact with the body of the vehicle. Such pneumatic systems are used in off-road vehicles and sport utility vehicles (SUV). Especially with SUVs with very powerful engines, it is desirable that the vehicle is provided with relatively little ground clearance on the one hand for high speeds on the road and on the other hand with a relatively large ground clearance for off-road. It is further desirable to carry out a change of the ground clearance as rapidly as possible, which increases the requirement for speed, flexibility and reliability of a pneumatic system having an air suspension installation.

A compressed air supply system typically supplies the air suspension system in a pneumatic system with compressed air from a compressed air supply, for example in the region of a pressure level of 5 to 20 bar. The compressed air is supplied by an air compressor of a pressure source. For supplying the air suspension installation, the pressure source is connected to a connection of a pneumatic line of the air suspension installation, which can also be pneumatically connected to a vent. The compressed air supply installation and the air suspension installation can be vented by blowing off air via a venting valve apparatus. A pneumatic supply line of the compressed air supply installation usually comprises an air dryer in order to ensure long-term operation of the compressed air supply installation or to prevent the collection of moisture in the pneumatic system.

A control valve in the form of a solenoid valve—also referred to as a switching valve—is usually connected upstream of each air bellows of the air suspension installation. A control valve is connected to the pneumatic line of the air suspension installation such that the air bellows can be filled or emptied—depending on a switching state of the control valve. In other words, air masses can be adjusted in an air bellows in order to thereby regulate the suspension characteristics or the level for a vehicle.

It is desirable to provide an improved air suspension installation not only with respect to the increasing requirement for speed, flexibility and reliability, but in addition— without having to make restrictions of a functional nature— as simply as possible.

SUMMARY OF THE INVENTION

Generally speaking, it is an object of the present invention to provide an air suspension installation and a pneumatic system as well as a vehicle and a method, in which the pneumatics of the air suspension installation are simplified such that relatively simplified control of the air suspension installation is achieved without functional restriction of the air suspension installation or of the pneumatic system. In particular, an object is to increase the functionality of the air suspension installation with respect to speed, flexibility and reliability.

According to an embodiment of the present invention, the air suspension installation for a vehicle having a pneumatic installation provided for operation with a compressed air supply installation comprises:

1. a pneumatic line having a connection to the compressed air supply installation;
2. a plurality of air bellows, wherein an air bellows is connected to the pneumatic line by means of a control valve in the form of a solenoid valve, and wherein the air bellows can be filled or vented depending on a switching state of the control valve;
3. a first control valve and a second control valve, which form a control (solenoid) valve assembly, wherein the first control valve forms a primary valve and the second control valve forms a secondary valve of the solenoid valve assembly; in particular, the solenoid valve assembly comprises a pneumatic part that can be actuated by a magnetic part;
4. a first air bellows and a second air bellows associated with the solenoid valve assembly, which can be filled or vented depending on a switching state of the primary valve and of the secondary valve; and
5. a controller, in particular of the magnetic part of the solenoid valve assembly, for controlling the primary valve and the secondary valve, acting on both together.

Embodiments of the invention are based on the consideration that a switching valve is connected upstream of an air bellows of the air suspension installation that is used as a pressure chamber for a pneumatic spring, namely via a control valve in the form of a solenoid valve for controlling an air mass in the air bellows. In particular, each air bellows has an associated control valve for reasons of functional safety. Each of the control valves can, in principle, be connected by means of a separate control line to a controller and could be separately controlled or monitored. However, the inventors have recognized that it is possible, without restrictions on functional safety, to assign a control valve to each air bellows and yet to provide simplifications with respect to the controller. For this purpose, the invention provides for the formation of the first and second control valve as the control (solenoid) valve assembly, wherein the first control valve forms the primary valve and the second control valve forms the secondary valve of the solenoid valve assembly. The solenoid valve assembly advantageously comprises the pneumatic part that can be actuated by the magnetic part. Depending on the switching state of the primary valve and of the secondary valve, a first and a second air bellows associated with the solenoid valve assembly can be filled or vented. The combination of the first and second control valve in a solenoid valve assembly forms the basis for the simplification of the pneumatics and of the controller of the first and second control valves. Also, the primary valve and the secondary valve can be controlled by a controller of the solenoid valve assembly, especially of the magnetic part, common to both and acting on both. With the controller acting on both the primary valve and the secondary valve, the same can be electronically controlled simultaneously or sequentially. In particular, however, the number of control valves associated with the air bellows (e.g., four for a four-wheel vehicle) can be combined into groups of (e.g., two) solenoid valve assemblies, each having a primary valve and a secondary valve.

It will be appreciated that, with the inventive embodiments, costs and risks of failure of an air suspension installation can be reduced, primarily because the jointly acting controller of the magnetic part of the solenoid valve allows assembly interfaces, lines and final control stages, which are provided separately for each control valve in the prior art, to be omitted. Moreover, connections in the cabling and the electronics can be omitted; and the number of controllers can be reduced, because at least the primary valve and the secondary valve can be controlled by a controller of the magnetic part of the solenoid valve assembly common to both and acting on both. In this way, the power consumption is significantly reduced, which likewise increases reliability. The inventive embodiments also lead to a smaller structural volume and reduced weight of the air suspension installation.

A pneumatic part of a solenoid valve assembly includes the pneumatically operating parts, such as the valve with a valve body, valve seat, valve housing or the like. A magnetic part of a solenoid valve assembly includes the electrically and/or magnetically working parts, such as an actuator and/or controller for the valve and coil, with a winding, armature, yoke and core as well as a control line or the like and the connections of the control line to the controller and coil.

The jointly acting controller is preferably a magnetic part jointly acting on the primary and secondary valves, in particular a coil body, e.g., forming a dual armature solenoid valve or a common control line.

The primary valve and secondary valve of the solenoid valve assembly can be connected either in parallel or in series. The primary valve and secondary valve should be normally closed. In principle, however, a normally open variant is not excluded. All four variants can be combined with each other in any way. A series arrangement of the primary and secondary valves is suitable for a particularly flexibly configurable, time-sequential switching sequence of primary and secondary valves. A parallel arrangement of the primary and secondary valves is particularly suitable for the simultaneous switching of primary and secondary valves. Each primary and/or secondary valve is preferably in the form of a 2/2-way valve. A series arrangement of the primary and secondary valves is particularly suitable for the sequential switching of primary and secondary valves. The primary valve is preferably in the form of a 2/2-way valve or the secondary valve is preferably in the form of a 3/2-way valve.

According to an embodiment of the invention, a vehicle is equipped with an inventive air suspension installation as well as a compressed air supply installation. The compressed air supply installation preferably comprises a pressure source, a vent and a pneumatic supply line connected to the connection of the pneumatic line, into which an air dryer is connected.

In a preferred embodiment of the invention, the common magnetic part acting on the primary valve and the secondary valve comprises a common coil body acting on the primary and secondary valves as a common controller. This has the advantage that a separate coil body for each of the control valves can be omitted. For each solenoid valve assembly, only a single coil body is provided as a common controller jointly acting on the primary and secondary valves. Advantageously, practically half of all otherwise necessary coil bodies are omitted, which means a significant reduction in weight and control costs. In particular, the solenoid valve assembly is in the form of a dual armature solenoid valve. A dual armature solenoid valve preferably comprises a primary armature carrying a first seal element of the primary valve and secondary armature carrying a second seal element of the secondary valve, which are disposed in a common coil body as a common controller. The primary armature has an associated primary valve seat and the secondary armature has an associated secondary valve seat here. The basic functionality of a conventional dual armature solenoid valve is described in the applicant's DE 35 01 708 A1, which is hereby incorporated herein by reference in its entirety.

According to an embodiment of the present invention, the pneumatic installation comprises a gallery line, which is connected to the pneumatic line. A gallery line is a pneumatic distribution line, from which at least two branch lines emanate. In particular, an air bellows is connected to a branch line that is connected to the gallery line. The design of the pneumatic installation with a pneumatic line for connection to the compressed air supply installation as well as a gallery line and branch lines connected thereto, each with at least one air bellows and at least one control valve—i.e., primary valve and/or secondary valve—is salutary with regard to dynamics and the manner of operation.

Advantageously, the pneumatic installation comprises at least one other pressure chamber, e.g., in the form of a compressed air reservoir, a pressure sensor or the like. In particular, such a pressure chamber can be connected to the pneumatic line via a further control valve in the form of a solenoid valve such that the pressure chamber—depending on a switching state of the control valve—can be filled or vented. Preferably, the other control valve part is also part of a solenoid valve assembly in the form of a primary valve or a secondary valve.

In a pneumatic installation with a pneumatic line, gallery line and branch lines, the primary valve and/or secondary valve is preferably connected to at least one branch line to the pneumatic line, advantageously via the gallery line. In particular, it is advantageously provided that a bellows-side pneumatic connection of the primary valve is connected to a first branch line and a bellows-side pneumatic connection of the secondary valve is connected to a second branch line. The first and second branch lines are advantageously separate branch lines, each comprising an air bellows. This ensures that at least one control valve, namely the primary valve and/or the secondary valve, is disposed upstream of each air bellows. A pressure sensor can also be connected to the gallery line directly or via a branch line.

A pressure limiter advantageously holds a pneumatic connection sealed up to a relatively high limiting pressure and only opens it at a relatively high limiting pressure.

The invention encompasses a vehicle having at least two axles, wherein the first and second air bellows are disposed on one of the two axles to form a pneumatic spring in each case. Such a vehicle can, e.g., be a private vehicle, in particular an SUV (Sport Utility Vehicle) as already mentioned. The invention also has application in commercial vehicles.

In one embodiment, a vehicle can comprise an inventive single-axle air suspension. That is, for a single axle of the vehicle, a solenoid valve assembly is provided with a primary valve and a secondary valve. These can be controlled by a controller of the magnetic part of the solenoid valve assembly common to both and acting on both.

It is also possible to provide another axle of the vehicle with an inventive solenoid valve assembly. In particular, in addition to the first axle, at least one second axle of the vehicle also comprises a further solenoid valve assembly with a third and a fourth air bellows, with which a primary valve and a secondary valve according to the further solenoid valve assembly are associated.

So-called average value control leads to a pressure being set for the first and second air bellows associated with an axle of a vehicle according to an average value of the pressure in the first and second air bellows. With so-called left-right control, a separate pressure setting results in a pressure in the first and second air bellows being separately adjustable.

According to an embodiment of the invention, average value control can be provided for only one or both or a plurality of, possibly all, axles. Also, left-right control can be provided for one or both or a plurality of, possibly all, axles. Further, average value control can be provided for one of the axles and left-right control can be provided for another axle. Depending on requirements, combinations of the foregoing can be implemented for specified operating states of a vehicle as well as for setting to work processes or special applications with more complex control technology.

Advantageously, the primary valve and the secondary valve can be disposed in a parallel circuit. Also, it is desirable to provide a gallery-side pneumatic connection of the primary valve to a first branch line and a gallery-side pneumatic connection of the secondary valve to a second—separate—branch line. The design of the solenoid valve assembly as a parallel circuit of control valves is particularly advantageous in the context of average value control, involving control to an average value of the pressure of the first and second air bellows. It is also advantageous, and relatively simple, to control the primary and secondary valve with the same switching states. A corresponding controller configured to regulate the first and second air bellows pressure only according to an average value of the pressure of the first and second air bellows by specifying simultaneously identical switching states for the primary valve and secondary valve at all times, can be used. Such a controller is comparatively simple because it does not involve current control. For the case in which the primary valve and the secondary valve are associated with the two wheels of a single axle, in the context of average value control, the axles are each controlled in relation to the average value of a pressure at the air bellows of the two wheels. As a result, the axle is thus controlled equally on the left and right.

A control arrangement can be particularly simply implemented with which only one axle of a vehicle is provided with air springs, which are controlled according to average value control. This is preferably the front axle of a vehicle. The rear axle of a vehicle can, e.g., be provided with conventional control valves.

According to another embodiment, the controller can be configured such that a different pressure is controlled in the first and second air bellows. Such a controller can include a current control module with which different switching states can be specified for the primary and secondary valves. Also, this variation of a controller can be implemented with a solenoid valve assembly forming a parallel circuit.

By specifying different switching states of the primary and secondary valves, so-called right-left control can be achieved, with which a control valve assigned to the left wheel—e.g., the primary valve—and a control valve assigned to the right wheel—e.g., the secondary valve—are switched with different switching states, so that the associated air bellows can be subjected to different pressures.

Such left-right control can be achieved particularly simply based on a second variant of a solenoid valve assembly in a series circuit. That is, the primary valve and secondary valve can be disposed in a series circuit, wherein a gallery-side pneumatic connection of the primary and secondary valves of the solenoid valve assembly is connected to the same branch line.

In particular, at least one pneumatic line of the pneumatic installation comprises a residual pressure holding valve. Advantageously, at least one pneumatic line of the pneumatic installation—in particular the pneumatic line, the gallery line or a branch line—can comprise a residual pressure holding valve and/or a pressure limiter. It is advantageous for certain requirements to hold a residual pressure in the system. This can prevent a collapse of air bellows in an air suspension installation. A pressure limiter has the advantage that the pneumatic installation is protected against an excessive pressure loading.

In a method according to one embodiment of the present invention, the primary valve and the secondary valve of the solenoid valve assembly are designed to be activated time-sequentially in a first operating mode with a control current rising above a current amplitude. It can also be provided that the control current at first only exceeds a current amplitude for activation of the primary valve and thereafter remains in a range that only keeps the primary valve activated, while the secondary valve is not activated. At a later point in time, the control current can exceed a second current amplitude, which is sufficient to also activate the secondary valve. Thereafter, the control current can have a current amplitude that is sufficient to keep both the primary valve and also the secondary valve in the activated state. For deactivation of the secondary valve and the primary valve, a control current can be reduced below the foregoing current amplitudes, possibly with a known hysteresis. In a second operating mode the control current can rise comparatively rapidly to a current amplitude that lies above a current amplitude that is sufficient to activate the primary valve and the secondary valve simultaneously. For this, the current amplitude should lie above the highest current amplitude for activation of the primary valve and the secondary valve.

Activation of the primary valve and/or the secondary valve can take place for blowing off air or for delivering air to an air bellows. The air can be passed as an air flow via the pneumatic line. Activation of a primary or secondary valve can, e.g., take place according to a ride height control of the vehicle. For instance, air mass control connected to ride height control can also be provided, which controls a volumetric flow through the pneumatic line. Activation of the primary valve and/or the secondary valve can take place under time control. Time control is recommended, e.g., if a ride height display is too noisy. Time-controlled activation of the primary valve and the secondary valve can, e.g., also take place in the context of a regeneration cycle for the compressed air supply installation.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which.

LIST OF REFERENCE CHARACTERS 1 control unit
2 compressed air supply installation
3 pneumatic line
4, 5, 6, 10, 15 control line
7 coil body
8, 9, 16, 17 connection
11 control valve
12 gallery line
13 control valve
14 coil body
18 control valve
19 control valve
20 compressed air line
21 coil body
22 control valve
23, 24, 25, 27, 28, 29, 30 control line
26 pressure sensor
31, 32, 33, 34 sensor
35, 36, 37, 38 branch line
39, 40, 41, 42 residual pressure holding valve
43, 45, 47, 49 air bellows
44, 46, 48, 50 damping valve
51 compressed air reservoir
52, 53, 54, 55 control line
60 coil body
I, II primary valve, secondary valve
62, 63 bellows line
61, 64 control valve
65, 66 air bellows
100 vehicle
110 air suspension installation
120, 120', solenoid valve assembly
130, 130' solenoid valve assembly
200 pneumatic installation
210 pneumatic system
350, 360, 370, 380 branch line
600 common branch line
SA1, SA2, SA3, SA4 current amplitude
A1, A2 first axle, second axle
R1, R2, R3, R4 wheel
X1, X2 gallery-side connection of the primary or secondary valve
Y1, Y2, Y2a, Y2b bellows-side connection of the primary or secondary valve

DETAILED DESCRIPTION OF THE PREFERRED EMBODIMENTS

Figure 1:
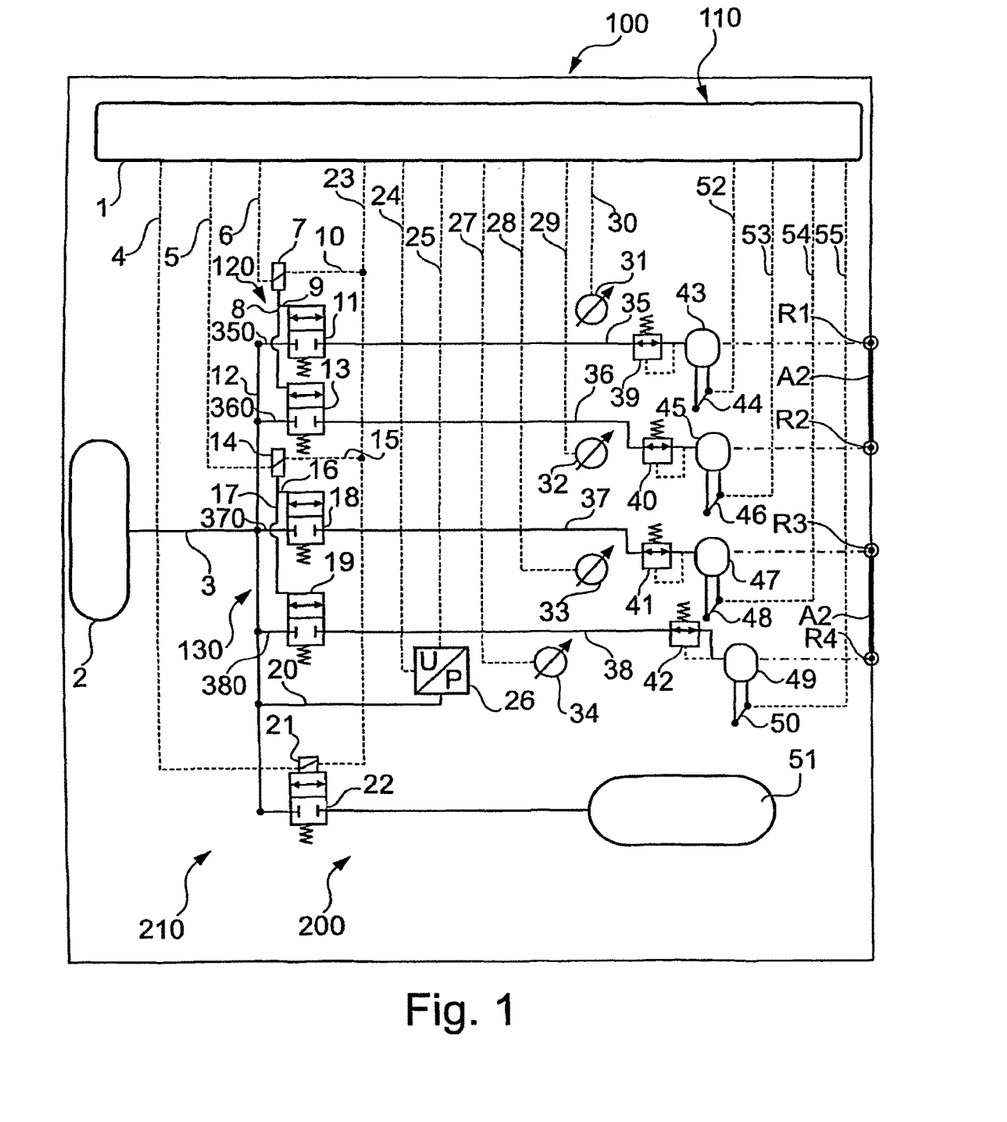
FIG. 1 is a schematic illustration of a pneumatic system with an air suspension installation and a compressed air supply in the form of a reservoir, according to an embodiment of the present invention.

FIG. 1 shows an example embodiment of an air suspension installation 110 for a schematically illustrated vehicle 100, which comprises a pneumatic installation 200 electronically controlled by means of a control unit 1 as part of one or a plurality of controllers. The pneumatic installation 200 forms a pneumatic system 210 together with a compressed air supply installation 2 symbolically illustrated here as a reservoir. A compressed air supply installation 2 usually comprises a compressed air source not illustrated here in detail, a vent and a pneumatic supply line with an air dryer connected to the connection of the pneumatic line 3.

The vehicle 100 can be, e.g., a private vehicle such as an SUV or the like, or a commercial vehicle. A first axle A1 with two wheels R1 and R2 and a second axle A2 with two wheels R3 and R4 of the vehicle 100 are symbolically illustrated. The air suspension installation 110 of FIG. 1 is configured in this respect as a two-axle air suspension installation for a two-axle vehicle 100. In a variation, one or a plurality of similar air suspension installations can also be realized for only one axle or more than two axles of a vehicle as required—the number of control valves and solenoid valve assemblies can be adapted accordingly. In general, not only compressed air but also a different gaseous or hydraulic pressure fluid can be used. The invention enables a simple implementation of an air suspension or general fluid suspension, with which a plurality of air springs or bellows can be controlled with a reduced number of solenoid valves.

In one embodiment, the air suspension installation 110 comprises a first and a second solenoid valve assembly 120, 130. The air suspension installation 110 for a two-axle vehicle 100, i.e., with a first axle A1 and a second axle A2, is provided with four control valves 11, 13, 18, 19, each of which is disposed upstream of a respective air bellows 43, 45, 46, 47, thereby forming a pneumatic spring. Each of the control valves 11, 13, 18, 19 is formed as a controllable 2/2-way valve, namely as a solenoid valve. Using the control valves 11, 13, 18, 19, air masses in the four air bellows 43, 45, 46, 47 can be regulated. As can be seen symbolically in FIG. 1 by means of dashed lines, the four wheels R1, R2, R3, R4 mounted on the vehicle axles A1, A2 each have an associated pneumatic spring. With the example embodiment shown in FIG. 1, the two air bellows 43, 45 are associated with the first axle A1 of the vehicle 100 forming the front axle, while the air bellows 47, 49 are associated with the second axle A2 of the vehicle 100 forming the rear axle.

The first control valve 11 forms a primary valve and the second control valve 13 forms a secondary valve of the solenoid valve assembly 120. The other first control valve 18 forms a primary valve and the other second control valve 19 forms a secondary valve of the other solenoid valve assembly 130. A primary valve of a solenoid valve assembly is referred to throughout below by "I". A secondary valve of a solenoid valve assembly is referred to throughout below by "II". In the illustrations of the switching states of FIG. 2 and FIG. 3, the control valves are characterized accordingly as a primary valve I or a secondary valve II. The control valves 11, 13, 18, 19 can optionally be combined in a valve block.

The control unit 1, e.g., an electronic control unit ECU, is connected via control lines 5, 6 to a coil body 14, 7 forming the magnetic part of a solenoid valve assembly 120, 130 in each case. That is, the control unit 1 is designed to carry out an actuation of the first control valves 11, 18 and second control valves 13, 19 in each case such that a primary valve I and a secondary valve II—denoted in more detail in FIG. 2—of one of the solenoid valve assemblies 120, 130 are controllable via the control lines 5, 6 and coil bodies 14, 7. Here, the control lines 5, 6 and coil bodies 14, 7 each form the controller common to both and acting on both the primary valve I and the secondary valve II. The coil body 7—as shown above the connections 8, 9—is an essential component of the magnetic part of the control valves 11, 13 and is coupled thereto. The coil body 14—as shown above the connections 16, 17, which are connected to each other— is an essential part of the magnetic part of the control valves 18, 19 and is coupled thereto. Each solenoid valve assembly 120, 130 is also in the form of a conventional dual-armature solenoid valve. A dual-armature solenoid valve also comprises a primary armature supporting a first seal element of the primary valve I (one of the first control valves 11, 18) and a secondary armature supporting a second seal element of the secondary valve II (one of the second control valves 13, 19), which are disposed in a common coil body 14, 7. Here, the primary armature is associated with a primary valve seat and the secondary armature is associated with a secondary valve seat.

Moreover, another coil body 21 of another control valve 22 in the form of a solenoid valve can be controlled via a control line 4 by the control unit 1 in order to selectively connect a compressed air reservoir 51 via the gallery line 12 to the compressed air supply installation 2 or to decouple it.

The other connections of the coil body 7, 14, 21 are each connected via individual control lines, e.g., 10, 15, to a common control line 23 and via the same to the control unit 1, wherein the common control line 23 can be set by the control unit 1 to a common potential, e.g., reference potential, null potential or supply voltage potential.

A compressed air supply installation 2 can, e.g., be a simple compressed air container or a compressed air supply installation 2 comprising a pressure source, a vent and a pneumatic supply line having an air dryer and connected to the connection of the pneumatic line 3. A gallery line 12 forming a compressed air distribution line is connected to the pneumatic line 3. A respective gallery-side compressed air connection of the control valves 11, 13, 18, 19 is connected to the gallery line 12 via branch lines 350, 360, 370, 380.

In the embodiment of FIG. 1—as will be explained in detail using FIG. 2 and FIG. 3—another separate branch line 35, 36, 37, 38 continuing a respective branch line 350, 360, 370, 380 is connected to a bellows-side compressed air connection of each of the control valves 11, 13, 18, 19. An air bellows 43, 45, 46, 47 is connected to the respective branch lines 35, 36, 37, 38. The air bellows 43, 45, 47, 49 respectively associated with the vehicle wheels R1, R2, R3, R4 are also connected via residual pressure holding valves 39, 40, 41, 42 in the branch lines 35, 36, 37, 38 to the bellows-side compressed air connections of the first and second control valves 11, 18 and 13, 19 in the manner shown in FIG. 1. Furthermore, respective damping valves 44, 46, 48, 50 are associated with the respective air bellows 43, 45, 47, 49, which can be controlled via control lines 52, 53, 54, 55 by the control unit 1.

For measurement of the pressure in the supply line 3 and the gallery line 12, a pressure sensor 26 is provided, which is connected via a compressed air line 20 to the gallery line 12 for pressure measurement and via electrical control lines 24, 25 to the control unit 1. The voltage supply for the pressure sensor 26 from the control unit 1 and the signal return to the control unit 1 can take place via the electrical control lines 24, 25. Alternatively, a separate third electrical control line for the signal return to the control unit 1 can also be provided. The pressure sensor 26 converts the measured air pressure into an electrical signal that can be delivered via the control lines 24, 25 to the control unit 1 and is evaluated by the same for system control purposes.

With the example embodiment shown in FIG. 1, there are sensors 31, 32, 33, 34 that apply their sensor signals via control lines 27 through 30, as shown, to the control unit 1 and that can be supplied with the required energy via the control lines. The sensors 31, 32, 33, 34 can be designed as sensors operating with pulse width modulation (PWM), which, e.g., can detect the distance between the wheels of the vehicle and the body of the vehicle. The control of the air bellows can take place depending on the sensor signals in order to achieve a constant, load-independent distance between a wheel R1, R2, R3, R4 and a vehicle body, or else in order to vary the distance between a wheel R1, R2, R3, R4 and the vehicle body in a controlled manner. There is, e.g., also the possibility of venting the system, e.g., by controlled connection of the air bellows 43, 45, 47, 49 to atmosphere via venting valves controllable by the control unit 1. This enables, e.g., a level correction by controlling the respective air masses in the four air bellows 43, 45, 47, 49 via the control valves 11, 13, 18, 19 and the venting valves, so that, e.g., lowering of the vehicle body can be achieved.

With the example embodiment shown in FIG. 1, an air mass in the four air springs or air bellows 43, 45, 47, 49 is controlled by means of the control valves 11, 13, 18, 19. One primary valve I (control valves 11, 18) in each case is controlled together with a secondary valve II (control valves 13, 19) by one of the two coil bodies 7, 14. Specifically, as can be seen from FIG. 1, the first and second control valves 11, 13 and the other first and second control valves 18, 19 are each equipped with a common electrically controllable coil body 7 or 14, which are respectively part of a solenoid coil of the magnetic part of the solenoid valve assembly 120 and the other solenoid valve assembly 130. Therefore only two coil bodies 7, 14 are necessary for operating the four control valves 11, 13, 18, 19, which simplifies the structure and control complexity.

According to the embodiment of FIG. 1, a balanced wheel load distribution can be achieved with a primary valve I and a secondary valve II of a solenoid valve assembly 120, 130. In a solenoid valve assembly 120, 130 the first and second control valves 11, 13 and the other first and second control valves 18, 19 are respectively connected pneumatically in parallel. In addition, a gallery-side pneumatic connection of a primary valve (first control valves 11, 18) is connected to a first branch line 350, 370 and a gallery-side pneumatic connection of a secondary valve (second control valves 13, 19) is connected to a second branch line 360, 380.

Figure 2:
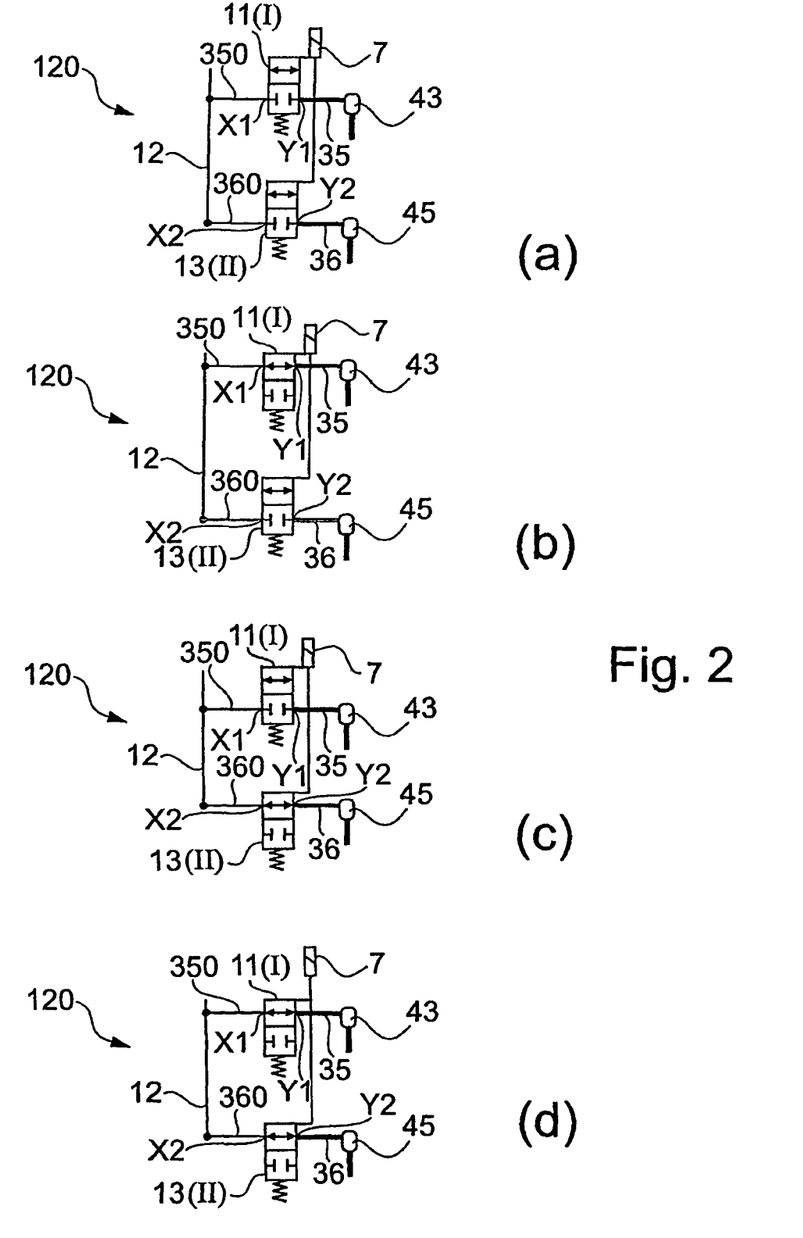
FIG. 2 shows in views (a) through (d) different switching states of a solenoid valve assembly consisting of a primary valve and a secondary valve in a pneumatic parallel circuit—i.e., in relation to two bellows, which are used to form two air springs of an axle for a vehicle—in accordance with an embodiment of the present invention.

This enables average value control to be achieved— preferably in the context of a switching state shown in FIG. 2(d) of a solenoid valve assembly 120, 130 having a series circuit of a primary valve and a secondary valve I, II. With the exemplary embodiment shown in FIG. 1, e.g., an average value control established for one of the axles A1, A2 can contribute to the transverse stabilization of the vehicle 100, e.g., when travelling round a curve. Two control valves 11, 13 or 18, 19 can be used here. Despite the use of two control valves, however, only one coil body is necessary for their control, wherein both control valves may be controlled in parallel. This design enables both control valves to be controlled and monitored while ensuring functional reliability, without each requiring its own control valve cable and output stage of the electronic control unit. The reliability can thereby be increased and the costs reduced.

The 2/2-way valves 11, 13, 18, 19 in FIG. 1 thus form primary and secondary valves I, II of the solenoid valve assemblies 120, 130 as air bellows valves. Also representative of the solenoid valve assembly 130 are the solenoid valve assemblies 120 with switching states shown in FIG. 2. The coil bodies 7, 14 of the magnetic parts of the solenoid valve assemblies 120, 130 are used to control the pneumatic part thereof—the latter is formed by means of the pneumatically parallel connected primary and secondary valves I, II.

In another embodiment, at least one of the first or second axles A1, A2 can be implemented with an individual control building on the embodiment according to FIG. 1. Also only a single coil body 7, 14 per axle is necessary here as an actuator, which can be separately controlled and monitored by the electronics. The control valves of the axle can optionally be controlled separately, resulting in individual control. This allows straightening of the vehicle 100 about the longitudinal axis, whereby, e.g., an asymmetric loading can be compensated for.

With the exemplary embodiment shown in further detail in FIG. 2, only the solenoid valve assembly 120 of FIG. 1 is shown in different switch positions for average value control of a single axle. Here, the same reference characters are used for identical or similar parts or parts having identical or similar function. The discussion that follows can also apply to the solenoid valve assembly 130 of FIG. 1. The coil bodies 7, 14 enable, by means of current control, the independent control of two respective control valves 11 (primary valve I), 13 (secondary valve II) or 18 (primary valve I), 19 (secondary valve II) using only one coil body 7 or 14.

The solenoid valve assembly 120 is connected to the pneumatic line 3 via the gallery line 12 and via at least one branch line 350, 360, wherein a bellows-side pneumatic connection Y1 of the primary valve I is connected to a first branch line 35 and a bellows-side pneumatic connection Y2 of the secondary valve II is connected to a second branch line 36, wherein the first branch line 35 and the second branch line 36 are separate branch lines. The primary valve I and the secondary valve II are disposed in a parallel circuit, wherein a gallery-side pneumatic connection X1 of the primary valve I is connected to a first branch line 350 and a gallery-side pneumatic connection X2 of the secondary valve II is connected to a second branch line 360—in the present case, the first branch line 350 and the second branch line 360 are separately connected to the gallery line 12. A control unit 1 is formed to regulate the pressure in the first and second air bellows 43, 45 according to an average value of the pressure of the first and second air bellows—also identical switching states can be specified for the primary and secondary valves I, II of the pneumatic parallel circuit in the solenoid valve assembly 120.

A first state is shown in FIG. 2 (*a*), in which the coil body 7 is not energized and both air bellows 43, 45 are shut off. The control valves 11, 13 are in their blocking position here.

In the second state shown in FIG. 2 (*b*), only the primary valve I is connected, i.e., the control valve 11, so that the air bellows 43, e.g., on wheel R1 left, can be pressurized or vented—this is also in accordance with the switch position of the control valve 22 and the pressure supply provided by the compressed air supply installation 2.

In the third state shown in FIG. 2 (*c*), only the secondary valve II is connected, i.e., the control valve 13, while the control valve 11 is blocking. This allows the pressurizing or venting of the other air bellows 45, e.g., of the air bellows on wheel R2 right, in the third state.

In the fourth state shown in FIG. 2 (*d*), both the primary valve I and also the secondary valve II, i.e., the control valves 43, 45, are connected, so that pressurizing or bleeding of both air bellows 43, 45 can take place simultaneously.

With the embodiment according to FIG. 2, switching back and forth between the state according to FIG. 2(*a*) and the state according to FIG. 2(*d*) can take place without current control. This presents the concept of "two-stage magnet in pneumatic parallel circuit" for average value control. Using control with current control, the state according to FIG. 2(*b*) can be switched additively, e.g., by regulating the current delivered from the control unit 1 via the control line 6 so that the coil body 7 can now switch the control valve 11 into the through position, but the generated magnetic force is not yet sufficient to switch the control valve 13 from the blocking state to the passing state as well.

In order to achieve the state according to FIG. 2(*c*), structural measures can also be taken in addition to current control, e.g., by ensuring a specified switching hysteresis by structural means. This can be used for a switching behavior such as is explained using FIG. 4. For example, by current control and the switching hysteresis, the control valve 13 remains switched to the open position, while the control valve 11 returns to the blocking position—as shown in FIG. 2 (*c*). It can also be held in the blocking position continuously independently of the switching operation of the control valve 13.

By means of the states shown in FIGS. 2 (*b*) and 2 (*c*), right-left control can also be achieved, so that the air bellows on the left and right can be controlled independently of each other and can be pressurized or vented, whereby, e.g., a tilted position of the vehicle caused by asymmetric loading can be balanced out.

Figure 3:
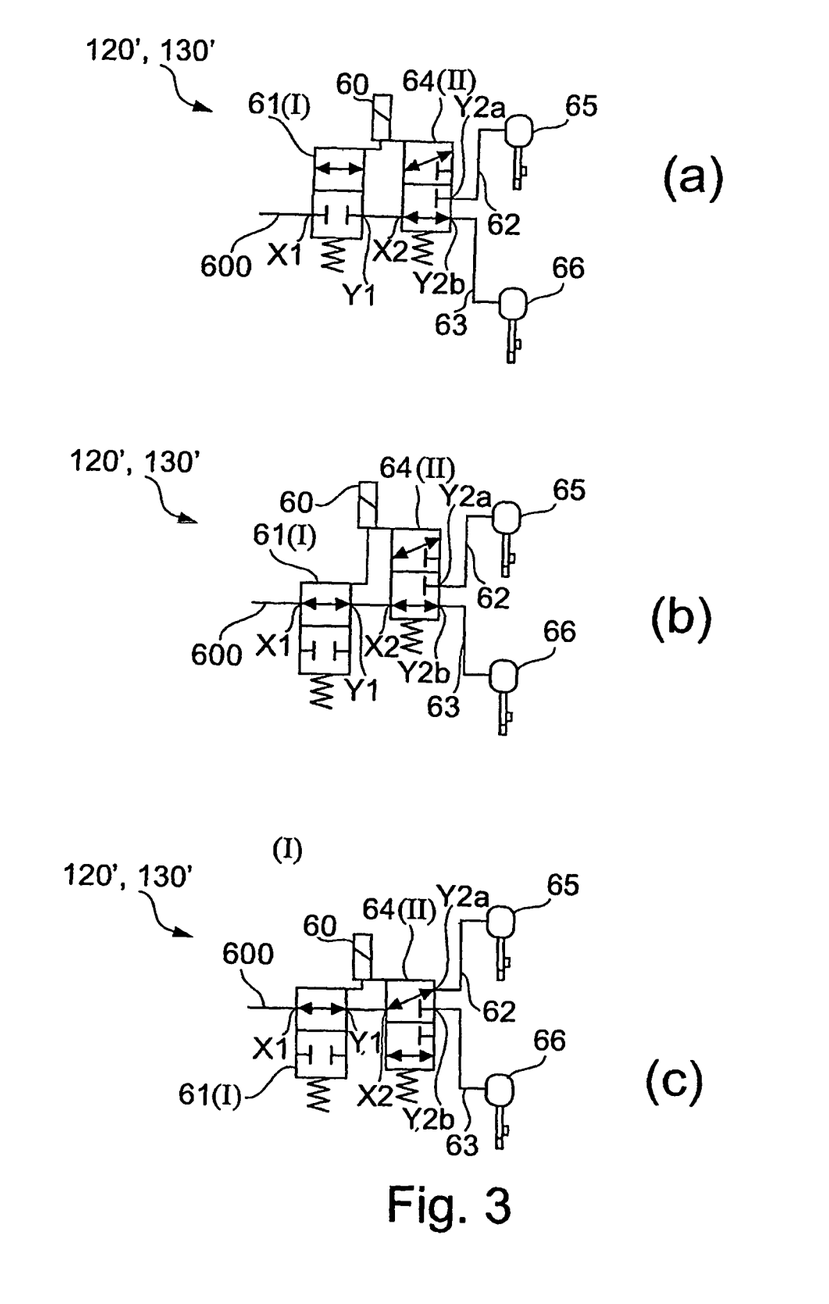
FIG. 3 shows in views (a) through (c) different switching states of a solenoid valve assembly consisting of a primary valve and a secondary valve in a pneumatic series circuit—i.e., in relation to two air bellows, which are used to form two air springs of an axle for a vehicle—in accordance with an embodiment of the present invention.

Another exemplary embodiment is shown in FIG. 3—again, the control valves 61, 64 shown there, also referred to as a primary valve 61 and a secondary valve 64, each form a solenoid valve assembly 120' or 130'. These could be used instead of the solenoid valve assembly 120 or 130 of the embodiment of FIG. 1.

In the present case, a coil body 60—as with the embodiment of FIG. 1—of primary valve I (control valve 61) and secondary valve II (control valve 64) is also used as a common coil body 60 acting on both for controlling the switching states thereof. The coil body 60 of FIG. 3 is part of a coil of the solenoid valve assembly 120', 130' forming a magnetic part, which is designed for selectively controllable switching of a primary valve I and a secondary valve II. The primary valve I is designed as a 2/2-way valve 61; the secondary valve II is designed as a 3/2-way valve 64. The latter primary valve I and secondary valve II are, unlike the embodiment of FIG. 1 in the context of the dual-armature solenoid valve, pneumatically connected in series. The 2/2-way valve 61 and the 3/2-way valve 64 are pneumatically connected in a series circuit and both use a common gallery-side pneumatic connection of the solenoid valve assembly 120', 130' to the same branch line 600 for the primary and secondary valve I, II. The branch line 600 in turn is connected to the gallery line 12. The common branch line 600 thus leads—as in FIG. 1—to a gallery line 12 that is shown there.

The solenoid valve assembly 120', 130' is connected to the pneumatic line 3 via the gallery line 12 by at least one branch line 600, wherein a pneumatic bellows-side connection Y1 of the primary valve I is connected into a first branch line 600 and a pneumatic bellows-side connection Y2*a*, Y2*b* of the secondary valve II is connected into a second branch line 62, 63, wherein the first branch line 600 and the second branch line 62, 63 are separate branch lines. The primary valve I and the secondary valve II are disposed in a series circuit, wherein a gallery-side pneumatic connection X1, X2 of the primary valve I and secondary valve II of the solenoid valve assembly 120', 130' is connected to the same branch line 600. In the present case, the branch line 600 is connected as a single branch line 600 to the gallery line 12. A control unit 1 is designed to control a different pressure in the first and second air bellows 65, 66. In particular, different switching states can be specified for the primary and secondary valves I, II of a pneumatic series circuit in a solenoid valve assembly 120', 130'.

The embodiment shown in FIG. 3 is suitable for an axle A1, preferably having left-right control—but, if required, also having average value control. A primary valve I formed by the control valve 61 is connected directly into the branch line 600 by a gallery-side connection X1 and a bellows-side connection Y1 for conducting compressed air. The secondary valve II formed by the control valve 64 is in turn connected directly into the same branch line 600 by a gallery-side connection X2 for conducting compressed air. Here, the gallery-side connection X2 of the secondary valve II is facing the bellows-side connection Y1 of the primary valve I—i.e., the same branch line 600 connects the bellows-side and gallery-side connections Y1, X2. Moreover, the secondary valve II formed by the control valve 64 comprises bellows-side connections Y2a, Y2b to bellows lines 62, 63, each leading to an air bellows 65, 66. The common branch line 600 is thus used at the same time as an input connection for the control valve 64, which is connected to the air bellows 65, 66 via two bellows-side connections Y2a, Y2b disposed at the output and the bellows lines 62, 63. Instead of a bellows line, in principle a line, e.g., as shown in FIG. 1, can be connected to a compressed air reservoir 51.

With this embodiment, the components 60 through 66 shown in FIG. 3 can replace the components 7, 11, 13, 43, 45 shown in FIG. 1. Alternatively or additionally, the components 60 through 66 shown in FIG. 3 can also be used in place of the components 14, 18, 19, 47, 49 shown in FIG. 1. The air bellows 65, 66 can be provided with damping valves and/or residual pressure holding valves, as shown in FIG. 1.

FIG. 3 (a) specifically shows a solenoid valve assembly 120', 130' in the form of a dual-armature solenoid valve having a primary valve I (control valve 61) and a secondary valve II (control valve 64) connected in series—and these are shown in a state in which the coil body 60 is not energized and the solenoid valve assembly 120', 130' is blocking. While the control valve 64 is in the open position, it is, however, blocked by the upstream control valve 61. Both air bellows 65, 66 are therefore neither pressurized nor vented.

FIG. 3 (b) shows the solenoid valve assembly 120', 130' in a second state, in which only the control valve 61 is switched to the forward direction. Because the control valve 64 remains in its position, the air bellows 66, i.e., for example the air bellows on the right, is pressurized and vented. The air bellows 65, for example the air bellows on the left, remains blocked.

FIG. 3 (c) shows the solenoid valve assembly 120' 130' in a third state, in which both the control valve 61 and also the control valve 64 are connected. In this switch position, the control valve 61 is in the conducting position, as in FIG. 3 (b), but the control valve 64 is also switched over so that the air bellows 66 is now blocked, but the air bellows 65 is pressurized and vented via the control valve 64 connecting the air bellows 65 to the bellows line 63. With the embodiment shown in FIG. 3, the three states are switched by current control. Simultaneous pressurization or venting of the two air bellows 65, 66 is not provided. A series circuit of primary and secondary valves I, II in a solenoid valve assembly 120', 130' particularly provides left-right control, however.

In another embodiment of the invention, it is also possible to combine a solenoid valve assembly as described above as a dual-armature solenoid valve for an axle having a pneumatic parallel circuit of primary and secondary valves with optional average value control—for example in the embodiment of FIG. 1 or FIG. 2—or as a dual-armature solenoid valve for the axle having a pneumatic series circuit of primary and secondary valves—for example in the embodiment of FIG. 3—with two conventional solenoid valves for another further axle. Here, too, the corresponding switching and cabling complexity as well as the monitoring complexity are advantageously reduced with a dual-armature solenoid valve for at least one axle.

By the use of a dual-armature solenoid valve or a different solenoid valve assembly having a primary valve I and a secondary valve II, e.g., in a parallel circuit or a series circuit, in principle, a coil body can be saved, whereby the costs of the vehicle cabling and the electronic control unit are reduced.

The solenoid valve assembly 120, 13, 120'130' can, but does not have to, be provided in each case as a dual-armature valve with a coil body 7, 14, 60, by whose energization the respective armature is operated in a controlled manner and hence controlled switch positions of the two control valves can be set. Such a dual armature solenoid valve can, e.g., comprise two magnet armatures (primary armature and secondary armature) disposed in a common or separate armature guide assembly and optionally each loaded by a spring, which can be selectively or jointly operated by a common coil body. With the coil body not energized, the two armatures can each be in their basic positions, e.g., determined by the spring loading, while, when supplied with suitable currents in the coil body, the first and/or second armatures can be activated and changed into the other control valve switch position. Using current control, these switch positions can be specified and achieved in a controlled manner.

Figure 4:
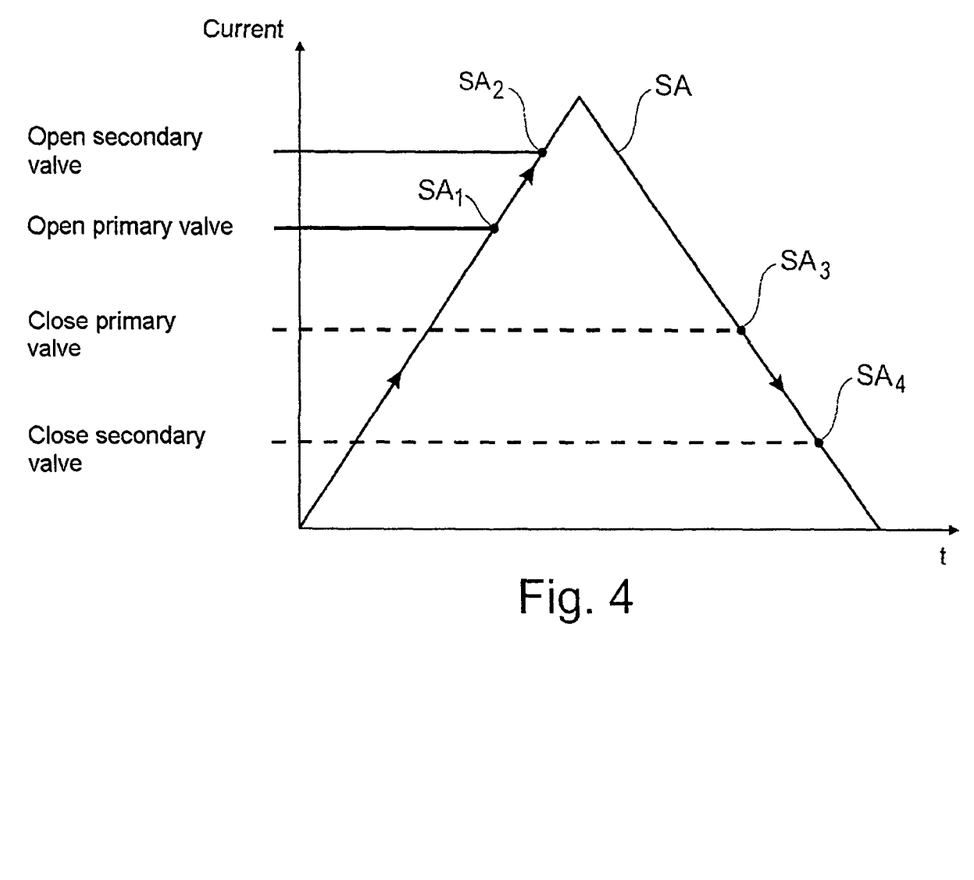
FIG. 4 is a graph of an exemplary current amplitude of a control signal as a time variation illustrating switching currents for a solenoid valve assembly in the form of a dual armature solenoid valve, by which the primary valve and the secondary valve are controlled via a common control line, in accordance with an embodiment of the present invention.

FIG. 4 is a symbolic illustration of a control current amplitude for the switching of a dual armature solenoid valve—in general, for a solenoid valve assembly 120, 120', 130, 130'—in different switching states, as shown, e.g., in FIG. 2 and FIG. 3. The current amplitude SA is illustrated here by a time profile t. The time profile can be used to determine an exact switching point of a primary valve I and/or of a secondary valve II. This can take place in the context of a diagnostic task for a vehicle controller ECU.

The graph of FIG. 4 shows a controlled current amplitude SA. In an initial state of a solenoid valve assembly, the primary valve I is closed and the secondary valve II is closed (e.g., FIG. 2 (a)—air bellows 43, 45 isolated from gallery line 12).

On exceeding a first current amplitude SA1, the primary valve I changes from a normally closed state into an opened switching state because of the setting of a control valve spring of the primary valve I (e.g., first control valves 11, 18 of FIG. 1 and FIG. 2 or control valve 61 of FIG. 3), i.e., it is switched over. In the switching state of a solenoid valve assembly, the primary valve I is open and the secondary valve II is closed (e.g., FIG. 2 (b)—air bellows 43 connected to gallery line 12, air bellows 45 isolated from gallery line 12).

On exceeding a second, in the present case higher, current amplitude SA2, the secondary valve II also switches (e.g., second control valves 13, 19 of FIG. 1 and FIG. 2), i.e., it changes in the present example from a normal closed state into a switching state that corresponds to the open state of the secondary valve II. In the switching state of a solenoid valve assembly the primary valve I is open and the secondary valve II is open (e.g., FIG. 2 (d)—air bellows 43, 45 connected to gallery line 12).

In principle, in a modified embodiment, the de-energized and energized switching states can also be selected oppositely; i.e. the primary and/or the secondary valve can be designed for a normally open and closed switching state when energized.

In the present case—with the primary and secondary valves I, II designed to be normally closed—when reducing the control current amplitude, the primary valve closes again, taking into account a certain hysteresis, when the current falls below a third current amplitude SA3, i.e., the primary valve now changes from the energized open state into the closed switching state occurring at lower current. In this switching state of a solenoid valve assembly, the primary valve I is closed and the secondary valve II is open (e.g., FIG. 2 (c)—air bellows 45 connected to gallery line 12, air bellows 43 isolated from gallery line 12).

On reducing below a fourth, in the present case lower, current amplitude SA4, the secondary valve II changes from the energized open switching state back into the de-energized closed switching state. A corresponding control current module can be provided in a control unit 1 in order to define switching states SA1 through SA4.

The foregoing switching sequence results independently from a series or parallel circuit of a solenoid valve assembly 120, 130 or 120', 130'.

However, in contrast to the foregoing examples of a parallel circuit of primary and secondary valves I, II in a solenoid valve assembly 120, 130 of FIG. 2(a)-(d), a through-flow pneumatic connection of the gallery line 12 to the bellows is assigned differently for a series circuit of primary and secondary valves I, II in a solenoid valve assembly 120', 130'.

With a series circuit of the primary and secondary valves I, II in a solenoid valve assembly 120', 130', with the primary valve closed (prior to exceeding the current amplitude SA1 and after reducing below the current amplitude SA3) none of the air bellows is connected to the gallery line 12 (FIG. 3 (a)). Blocking of the left to right air bellows (or vice-versa) is ensured with no control, e.g., with a series circuit of the above-mentioned type, whereby transverse stabilization is ensured by the suspension springs when travelling round a curve. This effect is also given by the embodiment according to FIG. 3.

With a series circuit of primary and secondary valves I, II in a solenoid valve assembly 120', 130', with the primary valve open (after exceeding the current amplitude SA1 and prior to reducing below the current amplitude SA3) either the air bellows 65 or the air bellows 66 is connected to the gallery line. Prior to exceeding the current amplitude SA2, the air bellows 66 is connected to the gallery line (FIG. 3 (b)). After exceeding the current amplitude SA2, the air bellows 65 is connected to the gallery line (FIG. 3 (c)). Left-right control is optionally achieved with the series circuit shown in FIG. 3 by current control and a suitable design.

The switching currents of the individual switching stages can be adjusted in individual learning steps. Learning the current amplitudes SA1, SA2, SA3, SA4 as relevant switching points for an on/off switching state transition of the primary valve I (e.g., first control valves 11, 18 of FIG. 1 and FIG. 2 or primary valve 61 of FIG. 3) or of secondary valve II (e.g. second control valves 13, 19 of FIG. 1 and FIG. 2 or secondary valve 64 of FIG. 3) can take place during vehicle work—even only following a component replacement. An exact determination of a point in time of the movement of a control valve armature, namely a primary armature or secondary armature, for a primary or secondary valve cannot be readily detected. Learning the switching points, however, enables exact switching of the primary valve and of the secondary valve in a dual armature solenoid valve assembly 120, 130, 120', 130'. A learning procedure can advantageously be provided as a diagnostic task in the vehicle controller ECU in a module for current control, i.e., it can be stored in the ECU. A possible sequence can be:

1. For a current amplitude greater than SA2: switch on primary valve I and secondary valve II and pressurize air bellows to a pressure of, e.g., 6 bar.

2. For a current amplitude less than SA4: switch off primary valve I and secondary valve II and change to the de-energized state.

3. Vent gallery line 12 once and measure the pressure with a pressure sensor 26.

4. Slowly increase the current amplitude SA for primary valve I and secondary valve II and continuously measure the pressure using pressure sensor 26 to determine when, for an initial pressure rise, the current amplitude SA1 of the primary valve is reached, i.e., the primary valve is opened and connects the corresponding branch line to the corresponding air bellows, which can be recorded from the initial pressure increase.

5. Pressurize the gallery line 12 with the primary valve open, e.g., to 10 bar.

6. Vent the gallery line with the primary valve open and continuously measure the pressure using the pressure sensor 26.

7. Reduce the current amplitude SA and continuously measure the pressure using the pressure sensor 26. As a result, the current amplitude SA3 of the primary valve I is reached if the pressure does not reduce further. A pressure that does not reduce further is the result of the primary valve I changing from the open switching state into the closed switching state. The current amplitudes SA1, SA3 of the switching currents of the primary valve are determined by steps 4 and 7.

8. With the switched current amplitude SA1 and the gallery line 12 and the air bellows thereby connected via the primary valve I, vent once to, e.g., 1 bar.

9. Increase the current amplitude SA further and continuously measure the pressure using pressure sensor 26. If a pressure increase is observed, the current amplitude SA2 is reached to switch on the secondary valve II. Because the secondary valve II opens, this is noticeable through the increase. The pressure increase is established by the air bellows that are connected to each other via the open primary valve and secondary valve I, II.

The current amplitude SA4 does not have to be explicitly determined, because the closure of the primary and secondary valves I, II can be achieved simply by turning off the current amplitude SA. The current amplitudes SA1 through SA4 for switching points exactly determinable in this way can be used for the further optimized functional operation of the primary valve and secondary valve.

Accordingly, the present invention provides an air suspension installation 110 for a vehicle 100 having a pneumatic installation 200 designed for operation with a compressed air supply installation 2, which comprises a pneumatic line 3 having a connection to the compressed air supply installation 2, a plurality of air bellows 43, 45, 47, 49, each used as a pressure chamber for a pneumatic spring, wherein an air bellows is connected via a control valve in the form of a solenoid valve to the pneumatic line 3, and wherein the air bellows can be pressurized or vented depending on a switching state of the control valve. And, a first control valve 11, 18 and a second control valve 13, 19 form a controllable solenoid valve assembly 120, 130, which comprises a pneumatic part that can be operated by a magnetic part, wherein the first control valve 11, 18 forms a primary valve and the second control valve 13, 19 forms a secondary valve of the solenoid valve assembly 120, 130, a first air bellows 43, 47 and a second air bellows 45, 49 of the solenoid valve assembly 120, 130 is each assigned to and can be pressurized or vented depending on a switching state of the primary and secondary valve, and wherein the primary valve and the secondary valve can be controlled by a controller of the magnetic part of the solenoid valve assembly 120, 130 common to both and acting jointly on both.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. An air suspension installation for a vehicle having a pneumatic installation configured for operation with a compressed air supply installation, the air suspension installation comprising:
    a pneumatic line having a connection to the compressed air supply installation;
    a solenoid valve assembly including a primary control valve, a secondary control valve, and a magnetic part common to both the primary control valve and the secondary control valve; and
    a first air bellows and a second air bellows, at least one of the first and second air bellows being connected via at least one of the first and second solenoid control valves to the pneumatic line;
    wherein the first air bellows and the second air bellows is each associated with and can be one of pressurized and vented depending on a switching state of the primary control valve and of the secondary control valve, and
    wherein the magnetic part of the solenoid valve assembly is configured to selectively control the primary control valve and the secondary control valve independently from one another so as to independently control pressurization and venting of the first air bellows and the second air bellows.

2. The air suspension installation as claimed in claim 1, wherein the magnetic part common to both the primary control valve and the secondary control valve comprises a common coil body.

3. The air suspension installation as claimed in claim 2, wherein the controlled comprises at least one of a common coil body and a common control line.

4. The air suspension installation as claimed in claim 2, wherein the magnetic part of the solenoid valve assembly is configured to control the primary control valve and the secondary control valve independently from one another by way of regulating a current delivered to the common coil body.

5. The air suspension installation as claimed in claim 4, wherein the magnetic part of the solenoid valve assembly is configured to control the primary control valve and the secondary control valve to reach a switching state in which the primary control valve is open while the secondary control valve is closed by increasing a current delivered to the common coil body to a first current value at which the primary valve opens while the secondary valve remains closed; and
    wherein the magnetic part of the solenoid valve assembly is configured to control the primary control valve and the secondary control valve to reach a switching state in which the primary control valve is closed while the secondary control valve is open by first increasing a current delivered to the common coil body to a second current value at which the secondary control valve opens, the second current value being greater than the first current value, and then decreasing the current to a third current value at which the primary control valve closes while the secondary control valve remains open.

6. The air suspension installation as claimed in claim 1, wherein each of the primary and the secondary valves is a 2/2-way valve.

7. The air suspension installation as claimed in claim 1, wherein the pneumatic installation comprises a gallery line connected to the pneumatic, and wherein at least one of the first and second air bellows is connected to the gallery line via a branch line.

8. The air suspension installation as claimed in claim 7, wherein the first air bellows is connected to a first branch line and the second air bellows is connected to a second branch line.

9. The air suspension installation as claimed in claim 1, wherein the pneumatic installation comprises a compressed air reservoir connected via another controllable solenoid control valve to the pneumatic line, and wherein the compressed air reservoir can be one of pressurized and vented depending on a switching state of the other controllable solenoid control valve, and wherein the other controllable solenoid control valve is part of the solenoid valve assembly.

10. The air suspension installation as claimed in claim 1, wherein the solenoid valve assembly is connected by at least one branch line to the pneumatic line, and wherein a bellows-side pneumatic connection of the primary valve is connected into a first branch line and a bellows-side pneumatic connection of the secondary valve is connected into a second branch line, and wherein the first branch line and the second branch line are separate branch lines.

11. The air suspension installation as claimed in claim 10, wherein the pneumatic installation comprises a gallery line connected to the pneumatic line, and wherein the solenoid valve assembly is connected to the gallery line.

12. The air suspension installation as claimed in claim 1, wherein the pneumatic installation comprises a gallery line connected to the pneumatic line, the primary valve and the secondary valve are disposed in a parallel circuit, a gallery-side pneumatic connection of the secondary valve is connected to a second branch line, and the first branch line and the second branch line are separately connected to the gallery line.

13. The air suspension installation as claimed in claim 1, further comprising a control unit configured to control pressure in the first and second air bellows based on an average value of pressure of the first and second air bellows.

14. The air suspension installation as claimed in claim 13, wherein the control unit is configured to specify the same switching states for the primary and secondary valves, wherein the primary and secondary valves of the solenoid valve assembly are disposed in a pneumatic parallel circuit.

15. The air suspension installation as claimed in claim 1, wherein the pneumatic installation comprises a gallery line connected to the pneumatic line, the primary valve and the secondary valve are disposed in a series circuit, and wherein a gallery-side pneumatic connection of each of the primary valve and the secondary valve of the solenoid valve assembly is connected to the same branch line to the gallery line.

16. The air suspension installation as claimed in claim 1, further comprising a control unit configured to control a different pressure in the first and second air bellows.

17. The air suspension installation as claimed in claim 16, wherein the control unit is configured to selectively specify a switching state for the primary valve independent from a switching state of the secondary valve and to specify a switching state for the secondary control valve independent from a switching state of the primary control valve.

18. A vehicle, comprising at least two axles; and the air suspension installation as claimed in claim 1 wherein the first air bellows and the second air bellows are disposed on one of the first axle and the second axle to each form a pneumatic spring.

19. A method for operating the air suspension installation as claimed in claim 1, comprising:
one of pressurizing and venting the first and second air bellows of the solenoid valve assembly depending on the switching state of the primary and secondary valves, and
controlling the primary and secondary valves using the controller of the solenoid valve assembly common to and acting on both the primary and secondary valves.

20. The method as claimed in claim 19, further comprising one of (i) activating the primary valve and the secondary valve time-sequentially in a first operating mode with a control current rising above a current amplitude, the primary and secondary valves being in a pneumatic series circuit in the solenoid valve assembly, and (ii) activating the primary valve and the secondary valve substantially simultaneously in a second operating mode with the control current rising above the current amplitude, the primary and secondary valves being in a pneumatic parallel circuit in the solenoid valve assembly.

21. The air suspension installation as claimed in claim 1, wherein the primary valve is a 2/2-way valve and the secondary valve is a 3/2-way valve.

22. The air suspension installation as claimed in claim 1, wherein the solenoid valve assembly comprises a dual-armature solenoid valve.

* * * * *